Sept. 29, 1931.  R. HASE  1,825,229
OPTICAL PYROMETER
Filed Dec. 9, 1926  3 Sheets-Sheet 1
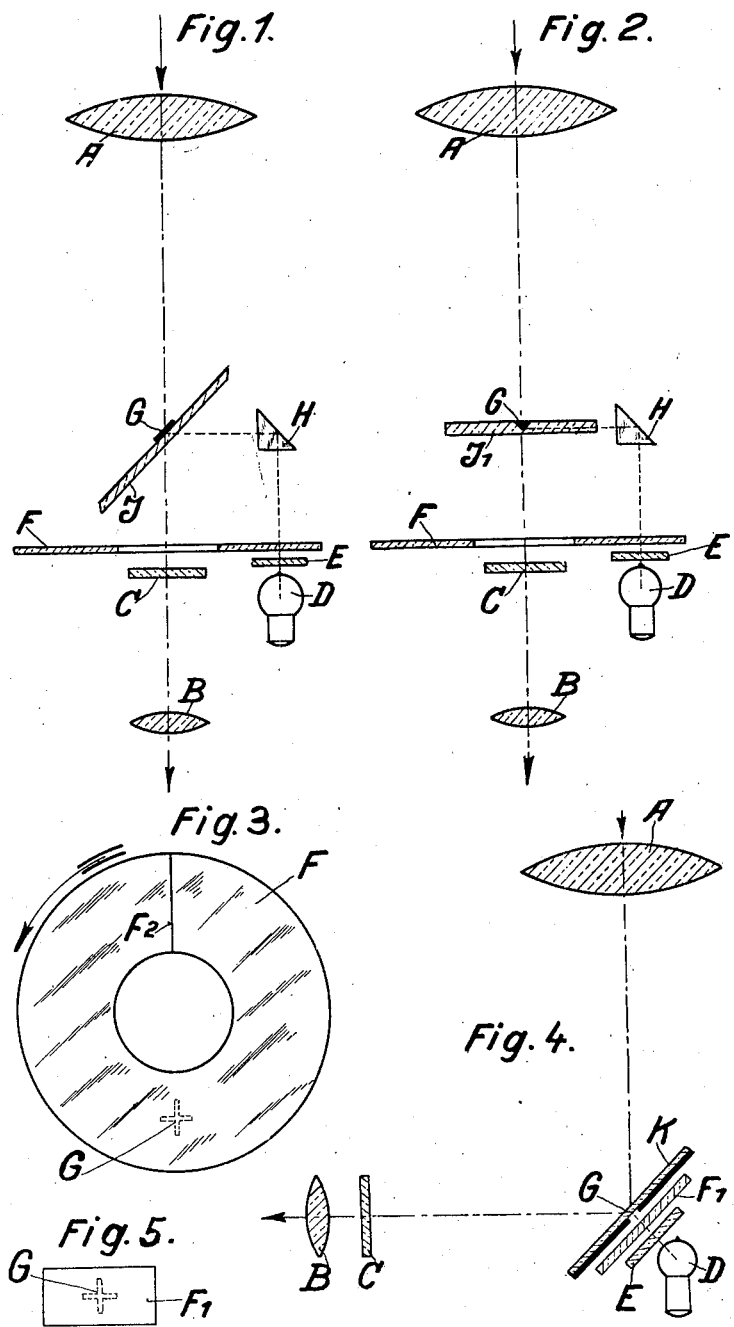

Sept. 29, 1931.   R. HASE   1,825,229
OPTICAL PYROMETER
Filed Dec. 9, 1926   3 Sheets-Sheet 2
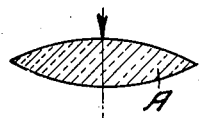
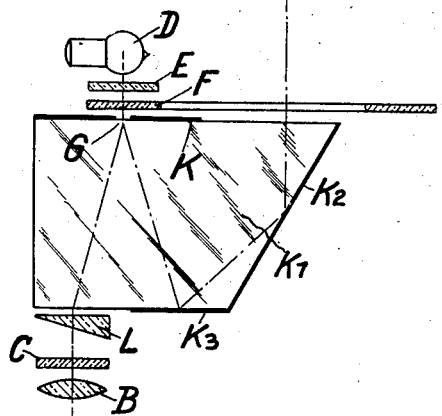
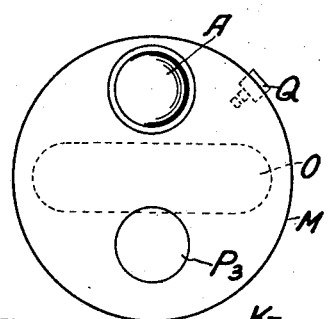
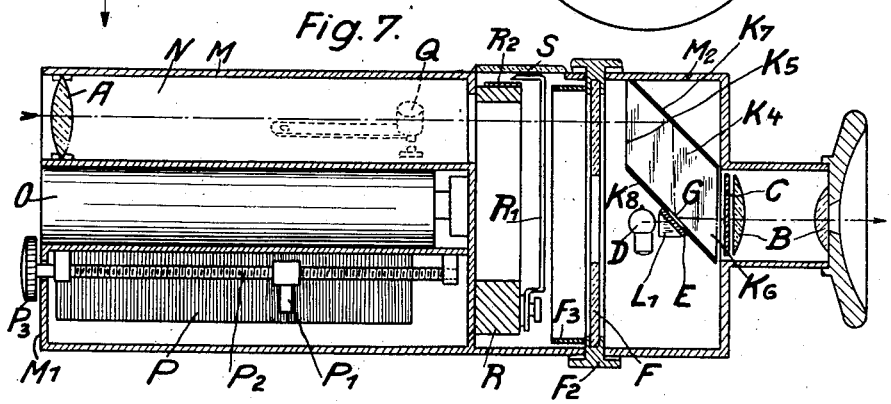
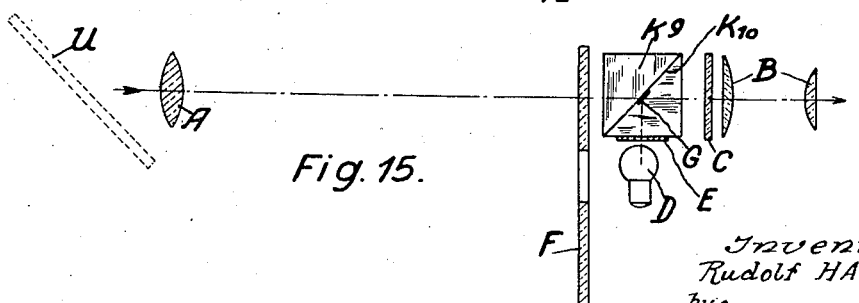

Sept. 29, 1931.  R. HASE  1,825,229
OPTICAL PYROMETER
Filed Dec. 9, 1926  3 Sheets-Sheet 3

Inventor:
Rudolf HASE
by
Love, Kehlenbeck & Farley
Attorneys.

Patented Sept. 29, 1931

1,825,229

UNITED STATES PATENT OFFICE

RUDOLF HASE, OF HANOVER, GERMANY

OPTICAL PYROMETER

Application filed December 9, 1926, Serial No. 153,486, and in Germany February 26, 1926.

This invention relates to optical pyrometers and more especially to telescopic pyrometers, the temperature indications of which are obtained by adjusting to equality as observed through the instrument the light radiated from the object of which the temperature is to be ascertained and light obtained from a comparison source such as a flame or an electric lamp. The purpose of the invention is the production of an easily manipulated instrument of this kind having a comparison light which can readily be brought into register with the light from even a small object, such as a tool in process of hardening; which dispenses with accurate and wide range electrical measuring instruments, and which is free from diffraction and distortion phenomena. With these purposes in view the invention comprises an optical pyrometer wherein the comparison light is constituted by a small surface illuminated by the diffused light of an electric lamp maintained at a constant brilliancy. The invention further includes the combination in a pyrometer of an electric lamp serving as the source of the comparison light, means for supplying current to the lamp, means for varying the current supplied to the lamp, and an indicator whereby the current may be adjusted to a predetermined value.

From another aspect the invention is a pyrometer comprising an eyepiece with means for directing into the eyepiece light from the object the temperature of which is to be measured, together with light from a comparison source in combination with a translucent plate or strip of graduated transparency interposed in the path of one of the beams proceeding to the eyepiece and capable of being traversed across the beam. A further feature of the invention is the formation of the illuminated surface which constitutes the comparison light as a device, a letter, or a simple cross or hyphen having besides the central part between which and the object identity of brilliance is established, lateral portions extending opposite more and less transparent parts of the translucent plate.

In a preferred embodiment of the invention the comparison light together with the electric lamp which constitutes its source, the electrically controlled circuit of the lamp, and the optical parts of the instrument are mounted in a case of tubular form and of small dimensions which can readily be held in the hand and does not require mounting on a stand.

Other features of the invention will be found described in detail hereinafter and pointed out in the appended claims.

The accompanying drawings show several constructions according to the invention.

Figures 1 and 2 are diagrammatic longitudinal sections of two constructions.

Figure 3 is a detail belonging to them.

Figure 4 is a diagram of a third construction.

Figure 5 is a detail of the same.

Figure 6 is a diagrammatic longitudinal section of a fourth construction.

Figures 7 and 8 are longitudinal section and end elevation respectively of a fifth construction.

Figure 9 is a longitudinal section of a sixth construction of which

Figure 9:
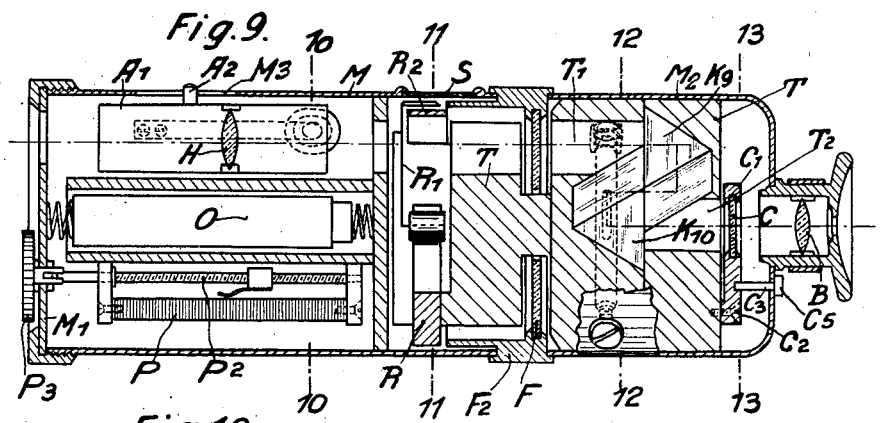
Figure 10:
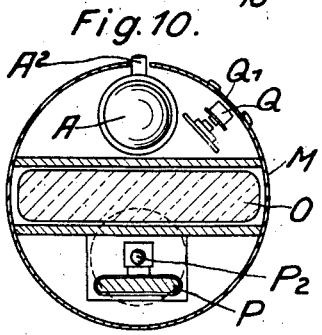
Figure 12:
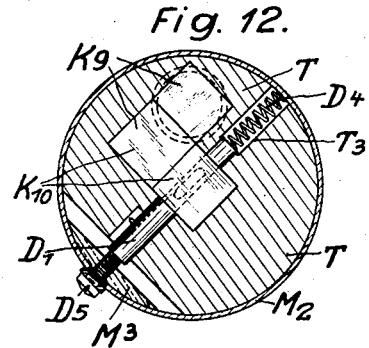

Figures 10, 11, 12 and 13 are cross sections on the lines 10—10, 11—11, 12—12 and 13—13 respectively of Fig. 9.

Figure 4 is a detail of the construction of Figure 9.

Figure 15 is a diagram of another construction.

In all the figures the path of the beam of light from the object of which the temperature is to be ascertained is indicated by dot-dash lines and the path of the beam from the comparison source is indicated by dotted lines. Also in all the figures A is the object glass of the instrument, B is its eyepiece, C a disc of coloured glass, preferably red, placed in front of the eyepiece, D the incandescent lamp forming the source of comparison light, E a disc of ground glass or the like placed in front of the lamp which, however, may be omitted if the bulb of the lamp is itself sandblasted, or is made of opal glass or the like; F and F1 indicate a device for varying the brilliance of one of the beams of light and G indicates the small surface which constitutes the comparison light.

In the constructions of Figures 1 and 2 the optical axes of the object glass A and eyepiece B are collinear. The small comparison surface G lies in this optical axis and is illuminated laterally by the prism H. F is a ring of glass revoluble about its centre. Its transparency is constant along any given radius but diminishes circumferentially from a maximum at a particular radius, for instance F2 in Figure 3, to a minimum immediately adjacent that radius. By rotating the ring the light from the incandescent lamp D can be more or less weakened. The comparison surface G is in the form of a narrow short strip parallel to the direction of movement of the plate F beside it; or better still it is in the form of a cross as indicated in dotted lines in Figure 3 with short narrow arms one extending parallel to the direction of movement of the disc and the other at right angles. Such forms of surface enable the instrument to be very exactly adjusted to the point at which the two beams of light appear equally brilliant; for when the middle part of the strip, or the middle part and the vertical arms of the cross are adjusted to equal brilliance with the image of the object of which the temperature is to be ascertained, one end of the strip or of the horizontal arm of the cross appears brighter than that image and the other end darker. The middle of the strip or the middle of the cross and its vertical arms cease to be distinguishable.

In Figure 1 the comparison surface G is mounted on the outer (object glass) side of an optical flat J i. e. a disc with optically worked parallel plane surfaces, which is set at an oblique angle to the optical axis. In Figure 2 the comparison surface G is in the interior of such an optical flat, for instance in a slot or the like, and the optical flat is at right angles to the optical axis.

In the construction of Figures 4 and 5 the optical axes of the object glass and eyepiece are at right angles. The comparison surface G consists in this case of a window provided in surface K which reflects the light of the object to be investigated, this window being illuminated from the rear by the incandescent lamp D. The brilliance of the comparison surface is controlled in this construction by means of a glass plate F1 (Figure 5) which can be moved parallel with the mirror K and which is of varying transparency from complete transparency at one edge to complete opacity at the opposite edge. The shape of the comparison surface may be as explained above.

In the constructions of Figures 6–14 the optical axes of the object glass and eyepiece are parallel and the small comparison surface G consists, as in Figure 4, of a window in a mirror surface reflecting the object of which the temperature is to be ascertained and illuminated from the rear by the incandescent lamp D.

In the construction of Figure 6 the mirror surface K is one surface of a prism K1 and the light from the object of which the temperature is to be ascertained is reflected also by the other surfaces of the prisms K2 and K3. The glass ring F and the comparison surface G may be such as above described. The small prism L serves merely to adjust the beam of light proceeding from the object and reflected by the surface K and the beam of light proceeding from the comparison surface G into parallelism with the optical axis of the eyepiece B.

In the construction of Figures 7 and 8 the optical system, the electrical apparatus and the other accessories are combined in a tubular instrument of small dimensions, the object glass A being mounted in one end of it and the eyepiece B in the other. The casing of such instrument consists of two tubes M and M2. In the left hand part of the instrument, as seen in Figure 7, the tube M presents a cylindrical space N the end of which is closed by the object glass A and beneath this is arranged a dry battery O, such as is used for pocket electric lamps, together with a variable resistance P, both battery and resistance extending longitudinally of the tube M. A sliding contact piece P1 mounted on a screw spindle P2 moves over the turns of the resistance P. Outside the tube the screw spindle has a knurled head P3 by which it may be rotated to adjust the position of the slide P1. Upon the side of the tube M there is mounted a press button Q for closing the battery and lamp circuit.

In the right hand end of the tube M there is a current measuring or indicating instrument including a permanent magnet R and a pointer R1; there is also a glass ring F. The ammeter is at right angles to the axis of the casing, that is to say, the axis of its pointer is parallel with the axis of the casing. Its scale R2 is marked on its periphery over which the end of the pointer R1 is bent, the periphery being an arc with its centre on the axis of the pointer. Opposite the scale R2 a window S is provided in the tube through which the deflection of the pointer may be observed. The glass ring F, which may be constructed as described with reference to Figures 1 to 3, is revoluble about the axis of the tube and its outer edge is fitted with a gripping ring F2 which surrounds the tube M. Within the tube there is attached to this ring a cylindrical flange F3 projecting towards the ammeter and upon this is a scale, preferably showing temperatures directly, which is also visible through the window S.

In the tube M2 are arranged the incandescent lamp D and the optical device by which beams from the lamp and from the object of which the temperature is to be measured are directed parallel to one another through the eyepiece B. The chief component of the optical system is a rhomboidal prism K4, the surfaces K5, K6 of which are at right angles to the optical axes while the surfaces K7, K8 are inclined at 45° to them and have reflecting coatings. There is a small window G in the coating of the surface K8 at the point where the pencil of light entering centrally through the object glass A falls upon it. This opening is illuminated from the rear by the incandescent lamp D and between it and the lamp there is a ground glass disc E and a small prism L1 which makes the beam from the lamp parallel with the optical axis of the instrument. The window G may be of the form described with reference to Figures 1 to 3.

The purpose of the coloured, preferably red, glass disc C interposed between the eyepiece B and the prism K4 is to enable measurements to be made with monochromatic light. For examining complex objects this disc may be pushed or folded to one side so that the examination may be made by white light and then replaced so that the measurement is made with red light.

When the observer directs the pyrometer towards the object of which the temperature is to be ascertained he sees an image of this object in the eyepiece B and within this image he sees the window G illuminated by the incandescent lamp D. By turning the glass ring F he can make the brilliance of the image exactly equal to that of the window.

The battery O, resistance P, current indicator R, R1, and press button Q are connected in series. The window G should be equally brightly illuminated for all measurements for which purpose the current through the incandescent lamp may be adjusted to a particular value. To adjust the current the pyrometer is so held that the scale R2 and pointer R1 can be seen through the window S. The thumb of the hand holding the instrument is in position to depress the button Q while the head P3 of the resistance spindle P2 can be turned with the other hand.

To make a pyrometric measurement the casing M, M2 is held in one hand and the glass ring F is turned with the other hand by means of ring F2 until the images of the object and the window G as seen in the field of the eyepiece appear equally bright. The temperature to be measured may then be read from the scale F3 through the window S.

The construction shown in Figures 9–13 differs from that of Figures 7 and 8 only in respect of certain details. The object glass A is mounted in a tube A1 which can telescope within the tub M. For this purpose a pin A2 secured upon the tube A1 projects through the slit M3 in the tube M.

To make the dry battery O and the variable resistance P readily accessible and the former readily interchangeable, the end wall M1 of the tube M is made to screw off. The head P3 for the resistance spindle P2 is mounted revolubly in the end wall M1 and has a clutch connection with the spindle P2. The press button Q (Figure 10) is wholly within the tube M which has a flexible disc Q1 in its wall adjacent to the press button. This arrangement guards against undesired depression of the button Q or damage to it.

The current measuring instrument mounted in the right hand end of the tube M is of somewhat different construction from that shown in Figure 7.

Figure 11:
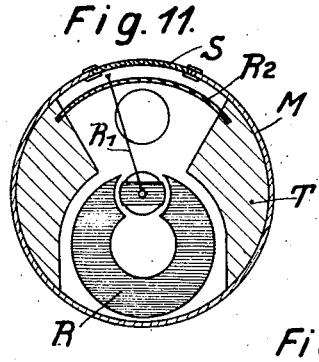
Figure 13:
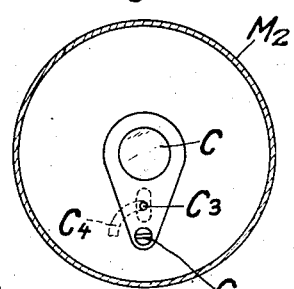
Figure 14:
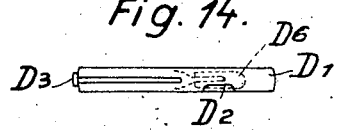

As shown in Figs. 9 and 11, the magnet R of the current indicator extends to approximately the middle of the housing M, M2, and the axis of rotation of the pointer R1 lies along the axis of the housing. The scale R2 is concentric with the latter axis and, like the magnet R, is fixed at both its ends to a block T, as described more fully hereinbelow.

The optical system mounted in the front part of the tube M2 consists of a Porro combination of two prisms K9, K10, placed at 90° to each other; these as is well known give an upright image which is not reversed side for side. The two prisms K9, K10, are mounted in a block T, made in several parts of light metal, which serves also to connect the front and rear parts of the casing M, M2 for mounting the ammeter R, R1 and the red disc C, and also takes the incandescent lamp D6. To permit the passage of the beam of light from the object of which the temperature is to be ascertained two longitudinal tunnels T1 and T2 are bored in the block T. The red glass C is mounted in a frame C1 (Figures 9 and 13) which is revoluble about a pin C2 and carries a second pin C3. The latter projects through a slot C4 in the front end wall of the tube M2, the slot being an arc with its centre at the pin C2, and upon the projecting end there is a head C5 by means of which the red disc C can be thrown out of or into the optical axis of the eyepiece B as desired.

The incandescent lamp D6 (Figure 14) is in the shape of a small tube and is mounted in a sheath or casing D1 in which there is an opening D2 opposite the filament of the lamp. Through this window light is thrown upon the window G (not shown in Figure 9) provided in the mirror surface of the Porro combination K9, K10 upon the optical axis of the eyepiece B. The window G may be as described with reference to Figures 1 to 3. At one end of the casing D1 there is an insulated contact D3 for connection to one terminal of the lamp, current passing to the other terminal of the lamp through the block T and the casing M, M2. The casing D1 is received in a bore T3 (Figures 9 and 12) in the block T in which it is not revoluble and which is so shaped that when the casing D1 is inserted its opening D2 is necessarily in the correct position. The front end of the casing D1 then lies against a spiral spring D4 within the bore T3. The casing D1 is retained within the bore T3 by a screw D5 accessible from without which is mounted in an insulating insert M3 in the casing M and supplies current to the contact D3.

Figure 15 illustrates only the optical system of a further modification the mechanical features of which may resemble those of Figures 7 and 8 or Figures 9 and 14. In those former constructions the beam from the object is reflected twice or four times; in Figure 15 the beam has a straight line path from the object glass A to the eyepiece B as in Figures 1 and 2. The beam from the incandescent lamp D is brought into parallelism with the beam from the object by means of a square prism K9 slit diagonally. The diagonal surface K10 is at an angle of 45° to the optical axis of the instrument and as in Figures 1 and 2 contains a small mirror surface G on which the beam from the incandescent lamp D strikes laterally and which may be of the form described with reference to Figures 1 to 3.

In addition to the advantages mentioned hereinabove or obvious to the expert, the following may be noticed. Pyrometers constructed in accordance with this invention can without other aid be employed for determining the temperature of objects no larger than a few millimetres. By the aid of suitable accessories the instrument may readily be converted into a micropyrometer suitable for determining the temperature of various points on an incandescent lamp filament or the like. In those constructions in which the brilliance of the comparison surface is not altered (i. e. Figures 7 to 15) all measurements are made with the same intensity of illumination in the field of view whatever the temperature of the object investigated; consequently the eye is not disturbed by excessively strong or unduly weak illumination of the field. These instruments may also be used as photometers for measuring the brightness of surfaces or other objects or even for measuring the intensity of illumination given by a source of light. For this purpose a white surface U is placed in front of the object glass A at an angle, for instance, of 45° to the optical axis as indicated in Figure 15 and the light from the source to be measured is allowed to fall at right angles upon this surface. Taking account of the distance of the source of light from the surface U and of the constants of the instrument the candle power of the source may be exactly measured in precisely the fashion above described for pyrometric measurements.

I claim:

1. An optical pyrometer comprising a casing, an object glass, an eye piece, a mirror arranged to reflect an image of the object whose temperature is to be measured into said eye piece, a window in the surface of said mirror, a comparison light arranged in close proximity to said window, means for illuminating said window from the rear thereof with diffused light from said comparison light, and means for varying the light intensity of said image to reduce it to the light intensity of said window.

2. An optical pyrometer comprising a casing, an object glass, and eye piece, a mirror arranged to reflect into said eye piece a beam of light from a hot object whose temperature is to be measured, an opening in the mirror surface providing a window, means for illuminating said window with diffused light from the rear thereof, said window constituting a comparison light, and means for varying the relatively light intensity of said beam and said window to reduce the same to equal intensity, said last-mentioned means including a ring arranged in the path of said beam and rotatable about its center, said ring being of uniform transparency along each radius but diminishing in transparency circumferentially from a maximum along one radius to a minimum back to such radius.

3. An optical pyrometer comprising a casing, an object glass, an eye piece, a mirror arranged to reflect into said eye piece a beam of light from a hot object whose temperature is to be measured, an opening in the mirror surface providing a window, means for illuminating said window with diffused light from the rear thereof, said window constituting a comparison light, and a ring arranged in the path of said beam and rotatable about its center, said ring being of uniform transparency along each radius but diminishing in transparency circumferentially from a maximum along one radius to a minimum back to such radius, said window being in the form of a cross having arms extending radially to the axis of rotation of said ring.

4. An optical pyrometer comprising a tubular casing, an object glass, an eye piece, means for reflecting an image of an object whose temperature is to be measured into said eye piece and including a mirror arranged to reflect directly into said eye piece a beam of light from such hot object, an opening in the mirror surface providing a window, means for illuminating said window with diffused light from the rear thereof and including an incandescent lamp and a battery and rheostat therefor, an ammeter, and means for varying the relative light intensity of the beams coming from said lamp and from a hot object whose temperature is to be measured, all of said optical and electrical mechanism being housed within said tubular casing, whereby an extremely compact and easily manipulated instrument is produced.

5. An optical pyrometer comprising a tubular casing, an object glass, an eye piece adapted to receive a beam of light from a hot object whose temperature is to be measured, a battery and an adjustable resistance positioned in the rear portion of said casing, a measuring instrument positioned at an intermediate portion of said casing, a glass ring likewise mounted in said intermediate portion and rotatable about the axis of said casing, said ring having areas of different degrees of transparency and arranged in the path of said beam of light to vary the intensity thereof, an incandescent lamp positioned in the forward portion of said casing, and optical elements likewise disposed in said forward portion of the casing for directing the beam from said hot object and a beam from said lamp parallel to each other to said eye piece.

6. An optical pyrometer as set forth in claim 5 wherein said measuring instrument is formed as a relatively thin body disposed transversely to the axis of said casing, a scale in said instrument, and a window in said casing overlying said scale.

7. An optical pyrometer as set forth in claim 5, including a gripping ring about the outer edge of the glass ring and extending through said casing, a scale for said glass ring inside said casing, and a window in the latter in registry with said scale.

8. An optical pyrometer as set forth in claim 5 including a disk of colored glass disposed to the rear of the eye piece and a block in said casing connecting the forward and rearward parts thereof, said measuring instrument, incandescent lamp, optical elements and colored glass disk being mounted on said block, whereby a compact and easily assembled structure is obtained.

9. An optical pyrometer as set forth in claim 1 including a block positioned in said casing, said illuminating means comprising an incandescent lamp, and a casing for said lamp, said block having a bore, and said casing being non-rotatably and removably positioned in said bore.

10. An optical pyrometer comprising a casing, an object glass, an eye piece, two Porro prisms arranged to reflect an image of the object whose temperature is to be measured into said eye piece, a window in one of the reflecting surfaces of one of said Porro prisms, a comparison light arranged in close proximity to said window, means for illuminating said window from the rear thereof with diffused light from said comparison light, and means for varying the light intensity of said image to reduce it to the light intensity of said window.

In testimony whereof I have signed my name to this specification.

RUDOLF HASE.